Oct. 7, 1941.   F. A. MILLER   2,258,334
TIRE DEFLATION INDICATING MEANS
Filed Dec. 15, 1939
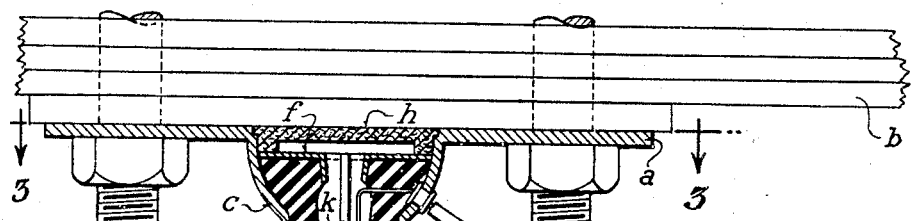
Fig. 2
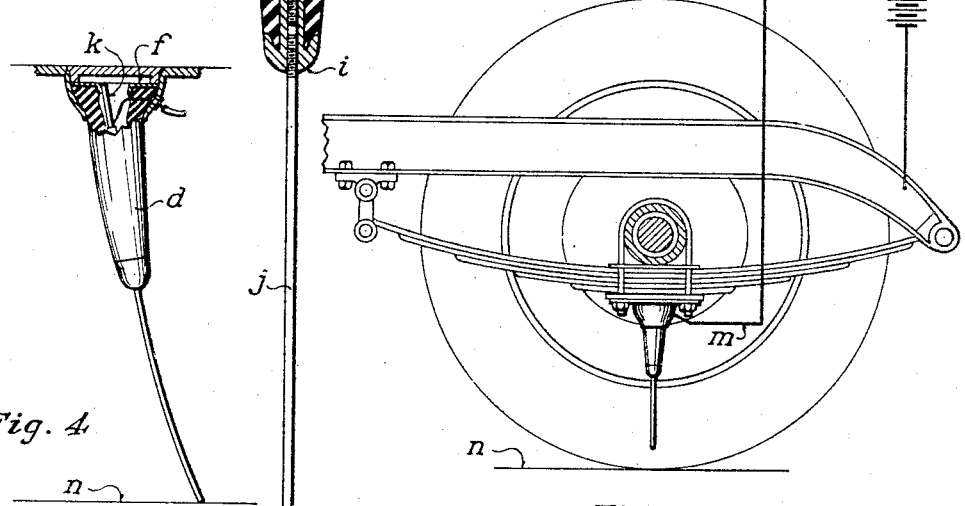
Fig. 4
Fig. 1
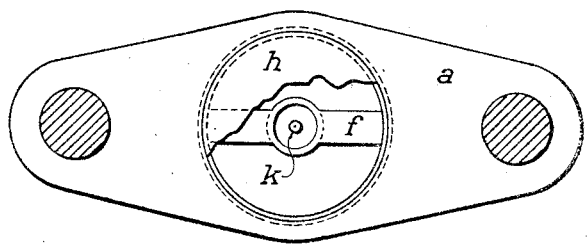
Fig. 3
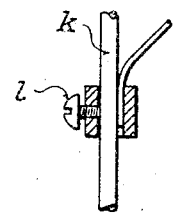
Fig. 5
Inventor
Fred A. Miller
By T. J. Geisler
and F. R. Geisler
Attorneys Patented Oct. 7, 1941

2,258,334

UNITED STATES PATENT OFFICE 2,258,334

TIRE DEFLATION INDICATING MEANS

Fred A. Miller, Oregon City, Oreg.

Application December 15, 1939, Serial No. 309,388

3 Claims. (Cl. 200—58)

My invention relates to a device to be affixed adjacent each of the pneumatic tires of a vehicle for indicating their deflation, so as to warn the driver to stop for timely repair.

The purpose of my invention is to use as a deflation indicating medium a pendant flexible member which, during normal inflation of the tires, will be suspended clear of the ground and allow for normal compression of the tires, but when the tire is collapsed by deflation to the degree as usually results from a puncture, the pendant member will be brought into contact with the ground and will be laterally flexed, which will result in a closing of the circuit of an electrically-operated indicating device, for example, an electrical light placed in view of the driver.

While tire deflation indicating means have heretofore been provided, these devices, in my opinion, are made up of too many parts, making them unnecessarily expensive to manufacture and besides are difficult to repair when broken.

The object of my invention is to provide a simple device, of few parts, easily applied and dependable, for indicating the deflation of a tire; and, furthermore, a device having a minimum exposure to injury in service, and which, when broken, may be readily repaired.

I attain the object of my invention, in its broad aspect, by providing for vehicle wheels having pneumatic tires deflation indicating means comprising the following parts; an electrically-operated indicator (for example an electric lamp); a make-and-break in the electrical circuit of said indicator; a pendant, resilient, flexible member (preferably made of insulating material) adapted to be affixed to the vehicle spring, (or other part of the vehicle) adjacent each wheel; said pendant member having a hollow flaring upper end, in which is secured, transversely, a contact ring connected with one pole of said circuit; and a contact bar, connected with the other pole of said circuit, affixed centrally in said hollow end of the pendant member, and adapted to be brought into contact with said contact ring and thus close said circuit, by the flexing of said pendant resilient member as would occur when the pendant member is brought into contact with the ground because of the deflation of the tire.

The specific elements employed by me for carrying my invention into practice are illustrated in the accompanying drawing, and hereinafter fully described.

In the drawing:

Figure 1 is a partial diagrammatic elevation illustrating the mounting of my invention, as in practice on the vehicle springs respectively, adjacent the wheels;

Figure 2 is a sectional detail of my invention;

Figure 3 is a plan detail of a part of my invention;

Figure 4 is a sectional detail illustrating the operation of my invention, and

Figure 5 is a further sectional detail of one of the parts of my invention.

My invention consists of a plate $a$ adapted to be fastened to a part of a vehicle, for example to vehicle spring $b$, as illustrated in Figure 2. The plate $a$, is provided with an annular socket $c$, preferably made of metal, which may be an integral part of said plate. In this socket is secured a pendant resilient, flexible operating member $d$ preferably made of rubber. This member may be made with a central bore and has a hollow, flaring upper end or head $e$, which is secured in the socket $c$, as illustrated in Figure 2. In said head is affixed transversely a contact plate $f$ having a central opening surrounded by an annular portion; this plate is connected through the medium of the socket $c$ and plate $a$ and vehicle springs $b$, with one pole of the electric circuit; see Figure 1.

The contact plate $f$ may be held against vertical upward displacement in said socket by an insulating cap $h$. The lower end of the resilient operating member $d$, may have affixed thereto a thimble $i$. Into this thimble is threaded a pendant rod or operating foot $j$.

In the upper end of the thimble $i$, is threaded a contact rod $k$, extending upward through the bore of the pendant flexible member $d$, and normally is centrally positioned within the central opening of the contact plate $f$. On the contact rod $k$, may be affixed a collar $l$, which may be fastened in place by a set screw, accessible through a hole provided in a side of a pendant member $d$, and the collar $l$, is connected by a wire extending through the pendant member $d$, to the conductor $m$ to the other pole, of said electrical circuit. The electric light $g$ is connected to said circuit.

The operation of my indicating means is illustrated in Figure 4. If, while the vehicle is standing, or while traveling, the tire is deflated to such extent as to cause the operating foot $j$, to bear on the ground (indicated by $n$, in Figures 1 and 2), this will cause the lateral flexing of the pendant member $d$, and thus bring the contact rod $k$, into contact with the contact plate $f$, thereby closing the electrical circuit of the lamp $g$, which may be placed on the instrument board of the vehicle or otherwise supported within view of the driver of the vehicle; the lighting of the lamp warning the driver of the deflation of a tire, so that he may stop and make the necessary repair.

The operating rod or foot $j$, must have sufficient resiliency so as not to be bent when it is caused to bear on the ground by the deflation of the tire; and the rod $k$, must have sufficient resiliency so as not to be bent by contact with the contact plate $f$, so that when the pendant resilient member $d$, again assumes its normal position because of the reinflation of the deflated tire, the contact rod $k$, will again become centrally positioned within the contact ring $b$.

The word plate—referring to the part $a$—is to be understood as defining any fixture or means by which the flexible member $d$, is fastened to a spring or other part of the chassis of a vehicle.

It is to be understood that the application of my invention is not restricted to an automobile, but may also be applied to a trailer and its operative parts connected to the circuit of indicating lamp in front of the driver by any convenient means.

Without limiting myself to the exact details of the construction above described, I claim:

1. An electrical tire deflation indicator comprising a cup-shaped holder adapted to be affixed to a vehicle chassis adjacent a wheel, a pendant, universally-flexible leg of insulating material having a flaring head adapted to be affixed in said cup-shaped holder, said leg having in its upper end an axially-extending cylindrical chamber, the lower end of said leg being normally spaced from the ground, a conductor-ring arranged transversely over the wall of said chamber and connected with one terminal of the indicator, a conducting-rod axially carried by the upper part of said leg in said chamber and projecting over and normally spaced from said conductor ring in said chamber, said rod being connected with the other terminal of said indicator, whereby upon the lateral flexing of said leg by contact thereof with the ground said rod is caused to close the circuit of the indicator.

2. An electrical tire deflation indicator comprising a cup-shaped holder adapted to be affixed to a vehicle chassis adjacent a wheel, a pendant, universally-flexible leg of insulating material having a flaring head adapted to be affixed in said holder, said leg having in its upper end an axially-extending cylindrical chamber, the lower end of said leg being normally spaced from the ground, a conducting disc secured in said chamber and having an annular flange extending over the wall thereof, said disc connected with one terminal of said indicator, a conducting-rod axially carried by the upper part of said leg in said chamber and projecting over and normally spaced from said conducting disc in said chamber, said rod being connected with the other terminal of said indicator, whereby upon the lateral flexing of said leg by contact thereof with the ground said rod is caused to close the circuit of the indicator.

3. An electrical tire deflation indicator comprising a cup-shaped holder adapted to be affixed to a vehicle chassis adjacent a wheel, a pendant, universally-flexible leg of insulating material having a flaring head adapted to be affixed in said holder, said leg having in its upper end an axially-extending cylindrical chamber, the lower end of said leg being provided with an extension normally spaced from the ground, a conductor-ring arranged transversely over the wall of said chamber and connected with one terminal of the indicator, a conducting-rod axially carried by the upper part of said leg in said chamber and projecting over and normally spaced from said conductor ring in said chamber, said rod being connected with the other terminal of said indicator, whereby upon the lateral flexing of said leg by contact thereof with the ground said rod is caused to close the circuit of the indicator.

FRED A. MILLER.